United States Patent [19]
Swift et al.

[11] Patent Number: 5,191,048
[45] Date of Patent: Mar. 2, 1993

[54] BIODEGRADABLE FREE-RADICAL ADDITION POLYMERS

[75] Inventors: Graham Swift, Blue Bell; Barry Weinstein, Dresher, both of Pa.

[73] Assignee: Rohm & Haas Company, Philadelphia, Pa.

[21] Appl. No.: 649,631

[22] Filed: Feb. 1, 1991

[51] Int. Cl.$^5$ .............................. C08F 34/02
[52] U.S. Cl. ..................... 526/271; 526/318
[58] Field of Search ................. 526/271, 318

[56] References Cited

U.S. PATENT DOCUMENTS

| | | | |
|---|---|---|---|
| 3,268,491 | 8/1966 | Hattori et al. | 260/78.5 |
| 3,755,264 | 8/1973 | Testa | 526/271 |
| 3,887,480 | 6/1975 | Rue et al. | 252/135 |
| 4,009,110 | 2/1977 | Topfl et al. | 252/8.9 |
| 4,659,793 | 4/1987 | Yang | 526/91 |
| 5,008,355 | 4/1991 | Tazi | 526/271 |

FOREIGN PATENT DOCUMENTS 1243446 10/1988 Canada .
391711 10/1990 United Kingdom ............... 526/271

OTHER PUBLICATIONS

"Copolymers of Acrylic with Vinyl Alcohol, Methyl Vinyl Ether and 2-Hydroxy-Acrylic Acid", Yukagaku, 34(6), 456 (1985).

Primary Examiner—Joseph L. Schofer
Assistant Examiner—Alex H. Walker
Attorney, Agent, or Firm—James G. Vouros

[57] ABSTRACT

This invention is directed to a terpolymer containing as polymerized units at least one first monomer selected from the group of vinyl acetate, vinyl ethers and vinyl carbonates, at least one second monomer of an ethylenically unsaturated monocarboxylic acid, and at least one third monomer of an anhydride of a dicarboxylic acid. The terpolymer is formed by a free-radical polymerization in a nonaqueous solvent. It has further been discovered that the partial hydrolysis, saponification, and saponification followed by oxidation of this terpolymer leads to terpolymer derivatives with improved detergent properties and improved biodegradability.

11 Claims, No Drawings

BIODEGRADABLE FREE-RADICAL ADDITION POLYMERS

FIELD OF THE INVENTION

This invention relates to terpolymers containing as polymerized units at least one first monomer selected from the group of vinyl acetate, vinyl ethers and vinyl carbonates, at least one second monomer of an ethylenically unsaturated monocarboxylic acid, and at least one third monomer of an anhydride of a dicarboxylic acid. These terpolymers are produced by a solvent polymerization process whereby the amount of hydrolysis that takes place during the polymerization reaction is less than one mole percent. This invention further relates to products resulting from partial hydrolysis, saponification or saponification/oxidation of the terpolymers. The terpolymers are partially biodegradable.

These terpolymers are useful in detergents, in cleaner formulations for hard surfaces, and as antiscalants, dispersants, incrustation inhibitors, deflocculants, drilling fluid aids and corrosion inhibitors. These terpolymers are also partially biodegradable. As used herein, "detergents" refers to compositions used in either fabric laundering applications or automatic dishwasher applications.

BACKGROUND OF THE INVENTION

In detergent applications, large volumes of chemicals are used. Because these chemicals may eventually enter the environment and reside in subsurface waters or open bodies of surface waters, it is highly desirable for such chemicals to be degradable in order to reduce any environmental problems.

Traditionally, detergents and cleaning agents have contained phosphates. These phosphates are added as detergent builders, to sequester alkaline earth metal hardness ions, as incrustation inhibitors and as antiredeposition agents. Despite the fact that the well known inorganic phosphorus compounds are highly effective and relatively non-toxic, they lead to environmental problems by causing excess plant growth, resulting in eutrophication of lakes.

During the past three decades, efforts have been made in the detergent industry to convert from the eutrophying phosphates to more environmentally acceptable materials such as polycarboxylic acid polymers and copolymers. Examples of such polycarboxylic acid polymers and copolymers are polyacrylic acid and acrylic acid and maleic acid copolymers.

While the polycarboxylic acid polymers and copolymers currently used in detergent and water treatment applications do not suffer from the same drawbacks as the phosphorus-containing inorganic builders, it is desirable that such chemicals used in large volume applications which enter the environment be biodegradable. Unfortunately, most polycarboxylic acid polymers and copolymers useful in detergent applications or as dispersants or as water treatment chemicals are not highly biodegradable. However, the present invention solves this problem by producing terpolymers having improved biodegradation properties relative to homopolymers or copolymers of polycarboxylic acids.

Most polymers used in detergent applications are polymerized via aqueous polymerization processes which have several drawbacks. First, in an aqueous process, the amount of each monomer that can be incorporated into the final terpolymer is limited by the solubility of the monomer in water. Therefore, the amount of a desirable monomer that can be incorporated into the final product is limited. Second, hydrolyzable functional groups present during the aqueous polymerization process will be hydrolyzed during the polymerization and may lead to an undesirable product. For example, if vinyl acetate is used in an aqueous process, it is partially converted to undesirable acetaldehyde. The present invention avoids these problems associated with an aqueous process by polymerizing terpolymers in a non-aqueous solvent.

U.S. Pat. No. 3,268,491 discloses an aqueous process for the preparation of vinyl acetate and dicarboxylic acid copolymers. Specifically, this process tries to prevent the hydrolysis of the vinyl acetate by requiring the presence of a redox catalyst in an amount of from 3 to 15 percent by weight, based on the total weight of the monomers, and strictly controlling the pH between 3 and 6. This process only discloses the use of vinyl acetate and dicarboxylic acid monomers to form copolymers, and does not disclose the possibility of using other monomers to form terpolymers.

U.S. Pat. No. 3,887,480 improves on the process disclosed in U.S. Pat. No. 3,268,491, discussed above, and discloses an aqueous process for preparing water-soluble polymers of maleic acid with at least one other copolymerizable monomer. This process requires the carrying out of the reaction in the presence of an amount not less than 17 percent by weight based on the sum of the monomers, of a persulfate catalyst. Despite the improvement over the previously discussed patent, this process has several problems. The very high catalyst content adds additional cost to the process, consumes additional chemicals and, because of the availability of additional peroxo groups, significantly changes the composition of the copolymers.

Canadian Patent No. 1,243,446 discloses another aqueous process for the preparation of copolymers containing from 10 to 60 percent by weight of the total monomer content of a monoethylenically unsaturated dicarboxylic acid, 40 to 90 percent by weight of a monoethylenically unsaturated monocarboxylic acid and from 0 to 20 percent by weight of a monomer free from carboxyl groups. This aqueous process requires from 0.5 to 5 percent hydrogen peroxide by weight, based on the monomers.

U.S. Pat. No. 4,659,793 discloses an aqueous process for the synthesis of copolymers of monoethylenically unsaturated dicarboxylic acids, such as maleic acid, with monomers selected from the group consisting of (a) monocarboxylic acids, such as acrylic acid, (b) an organic sulfonic acid compound, such as 2-acrylamido-2-methylpropanesulfonic acid, (c) a carboxyl-free monomer, such as vinyl acetate, and mixtures of said monomers (a), (b) and (c). This patent discloses an improved polymerization for the manufacture of these water-soluble polymers by using low levels of metal ions to promote copolymerization and reduce the amount of residual monomer. The amount of monomer (c), the carboxyl-free monomer, is dependent on the solubility of monomer (c) and is not greater than 30 percent of the total monomer employed.

Copending U.S. patent application Ser. No. 502,100 ('100) filed on Mar. 30, 1990, commonly assigned to the same assignee as the present invention, also describes a method of preparation of copolymers of monoethylenically unsaturated aliphatic dicarboxylic acids with $\alpha,\beta$- ethylenically unsaturated monomers. The '100 application describes an aqueous polymerization process for producing copolymers of more consistent composition by the simultaneous addition of the monomers to the reaction vessel. Again, as disclosed in U.S. Pat. No. 4,659,793, a carboxyl-free monomer can be used, but again, the concentration of the carboxyl-free monomer is dependent on its solubility. Furthermore, the carboxyl-free monomer could be susceptible to hydrolysis during the aqueous procedure.

In the publication, *Copolymers of Acrylic Acid with Vinyl Alcohol, Methyl Vinyl Ether and 2-Hydroxy-Acrylic Acid*, Yukagaku, 34(6) 456 (1985), a copolymer of sodium acrylate and vinyl alcohol, and a copolymer of disodium maleate and vinyl alcohol were reported for use as a detergent builder. The copolymer of sodium acrylate and vinyl alcohol was prepared by an aqueous polymerization of acrylic acid and vinyl acetate followed by neutralization with a 20 percent solution of sodium hydroxide to form the sodium acrylate and vinyl alcohol copolymer. Only copolymers containing from 3 to 12 mole percent vinyl alcohol were prepared. The copolymer of disodium maleate and vinyl alcohol was prepared by an aqueous polymerization of maleic anhydride and vinyl acetate followed by a simultaneous saponification and hydrolysis step to yield the copolymer. Because these copolymers were polymerized in an aqueous polymerization, some of the vinyl acetate is hydrolyzed prior to the saponification and hydrolysis step. Furthermore, there is no teaching in the Yukagaku article of the partial hydrolysis of only the anhydride portion of the copolymer and not the acetate portion of the copolymer.

U.S. Pat. No. 4,009,110 discloses copolymers containing as polymerized units monomers of maleic anhydride, diketene and vinyl alkyl ether, in a molar ratio of 1:(0.7 to 0.9):(0.1 to 0.3) and their subsequent use in detergent applications. These copolymers are polymerized using a non-aqueous process. Once formed, these copolymers are then hydrolyzed whereby either the maleic anhydride ring or both the maleic anhydride ring and the lactone ring are hydrolyzed.

SUMMARY OF THE INVENTION

The present invention relates to terpolymers which contain as polymerized units from about 15 to 55 mole percent of at least one first monomer selected from the group consisting of vinyl acetate, vinyl ethers and vinyl carbonates, from about 10 to 70 mole percent of at least one second monomer of an ethylenically unsaturated monocarboxylic acid, and from about 15 to 55 mole percent of at least one third monomer of an anhydride of a dicarboxylic acid. These terpolymers are polymerized in a non-aqueous polymerization whereby the amount of hydrolysis of the hydrolyzable groups is less than one mole percent. This invention also relates to products resulting from partial hydrolysis, saponification and saponification followed by oxidation of these terpolymers.

It is a further object of the present invention to provide detergent and cleaning formulations containing the terpolymers of this invention.

DETAILED DESCRIPTION OF THE INVENTION

The terpolymers of the present invention are synthesized from at least one first monomer selected from the group of vinyl esters, vinyl ethers and vinyl carbonates, such as vinyl acetate, methyl vinyl ether, ethyl vinyl ether, methoxy ethyl vinyl ether, and vinyl carbonate; at least one second monomer of an ethylenically unsaturated monocarboxylic acid such as acrylic acid and methacrylic acid; and at least one third monomer of an anhydride of a dicarboxylic acid, such as maleic anhydride and itaconic anhydride. The more preferred first monomer is vinyl acetate, the more preferred second monomer is acrylic acid and the more preferred third monomer is maleic anhydride.

The amount of the first monomer contained as polymerized units in the terpolymer is from about 15 to 55 mole percent, more preferably from about 25 to 50 mole percent and even more preferably from about 35 to 45 mole percent. The amount of the second monomer contained as polymerized units in the terpolymer is from about 10 to 70 mole percent, more preferably from about 15 to 30 mole percent and even more preferably from about 18 to 25 mole percent. The amount of the third monomer contained as polymerized units in the terpolymer is from about 15 to 55 mole percent, more preferably from about 20 to 50 mole percent and even more preferably from about 35 to 45 mole percent. The more preferred terpolymer composition is one containing about 40 mole percent of the first monomer, about 20 mole percent of the second monomer and about 40 mole percent of the third monomer.

The weight average molecular weight (Mw) of these terpolymers can be from about 1000 to 20,000 and more preferably from about 1000 to 10,000.

The terpolymers are synthesized by a solvent polymerization, thereby reducing hydrolysis taking place during the polymerization to less than one mole percent. Any conventional polymerization solvent not reactive with the monomers can be used. Suitable solvents include; ethers, such as lower alkyl ethers ($C_1-C_4$) for example diisobutyl ether, cyclic ethers, such as tetrahydrofuran and dioxane, glycol ethers, such as ethylene glycol dimethyl ether, ethylene glycol diethyl ether; ketones, such as acetone, methyl ethyl ketone, 2-hexanone, 3-hexanone, 2 and 3 heptanone, methyl isobutyl ketone, cyclohexanone; hydrocarbons, such as toluene, chlorobenzene, nitrobenzene; and other solvents, such as N-methylpyrrolidone, isophorone, ethyl acetate, butyl acetate and butyrolactone. The more preferred solvent is methyl ethyl ketone.

The reaction should be run at a solids level of from about 10 to 70 weight percent, more preferably from about 30 to 50 weight percent based on the total weight of the reaction composition.

Any standard type free-radical generating polymerization initiator, soluble in the polymerization solvent, can be used. Examples of such initiators include; azo compounds, such as 2,2'-azo-bis(isobutyronitrile), 2,2'-azo-bis(dimethylvaleronitrile), and 1-tert-butylazocyanocyclohexane; hydroperoxides, such as hydrogen peroxide, tert-butyl hydroperoxide, cumene hydroperoxide, benzoyl peroxide, di-tert-butyl peroxide, ethyl 3,3'-di(tert-butylperoxy)butyrate, ethyl 3,3'-di(tert-amylperoxy)butyrate, t-amyl peroxy-2-ethyl-hexanoate; peresters, such as tert-butyl peroxypivalate tert-butyl peroctoate, tert-butyl peroxyphthalate, tert-butyl peracetate, tert-butylperoxy benzoate, tert-butyl peroxyisobutyrate, tert-butyl peroxyneodecanote, tert-butyl peroxy-2-ethylhexanote, and tert-butyl peroxy maleic acid. The more preferred initiator is tert-butyl peroxypivalate. The concentration of initiator is from about 0.1 to 10 weight percent and more preferably from about 1 to 4 weight percent based on the total weight of monomers.

Polymerization initiators can be used alone (thermal initiators) or as the oxidizing component of a redox system, which would then include a reducing component such as ascorbic acid, malic acid, glycolic acid, thioglycolic acid, mercaptopropionic acid and its esters, mecaptoethanol, alkyl mercaptans, and polymercaptans such as 2,2'-dimercapto diethyl ether, ethylene and polyethylene dimercapto acetates and 3-mercaptopropionates, trimethylolethane and tris(3-mercaptopropionate)esters and glycolates. The more preferred is methyl 3-mercaptopropionate.

The reaction temperature is dependent on the type of initiator used and is generally in the range of 40° to 150° C. When the preferred initiator tert-butyl peroxypivalate is used, the temperature should be maintained within the range of about 50° to 120° C.

Initially, the reaction kettle is charged with the reaction solvent and initiator. Each monomer can then be added to the reaction kettle as separate feeds over the course of the reaction, or two or more of the monomers can be combined into one feed. Also, monomer can be contained in the initial charge in the reaction kettle. The more preferred technique is to have two monomer feeds, one being a combination of the first monomer and the third monomer and the second containing the second monomer.

The monomers can be added as solutions in the solvent of the reaction, or a miscible solvent, or can be added as pure monomer. It has been found to be advantageous to charge the kettle with a small portion of all three monomers, such as 5 to 10 weight percent of each, and then add the remainder of the monomers to the kettle over the course of the reaction.

The time for the reaction is dependent on the reactivity of the monomers used and is typically from about 0.5 to 10 hours and more preferably from about 1 to 3 hours.

The terpolymers formed are random terpolymers and are recovered from the reaction solvent by standard filtration techniques. Once recovered, the terpolymers can be modified by post-polymerization reactions, such as a partial hydrolysis, a saponification or a saponification follwed by an oxidation reaction, to form water-soluble products. It has been surprisingly found that if the terpolymer is partially hydrolyzed, that is, if the anhydride portion of the terpolymer is converted to an acid while leaving the portion derived from the first monomer intact, the performance of the terpolymer is improved over a fully hydrolyzed terpolymer.

The terpolymer is partially hydrolyzed by a hydrolysis reaction well known to those skilled in the art and is typically done by an aqueous reaction at ambient temperature of the terpolymer with a sodium hydroxide solution. The partial hydrolysis yields a derivative of the terpolymer whereby the anhydride portion of the terpolymer is converted to an acid, while the first and second portions of the terpolymer remain the same. For example, when the terpolymer is vinyl acetate, acrylic acid and maleic anhydride, the product of the partial hydrolysis reaction is a terpolymer of vinyl acetate, acrylic acid and maleic acid. The product of the partial hydrolysis can also be in the form of a salt, such as the alkali metal, alkaline earth metal, amine or ammonium salts.

The terpolymer is saponified using any typical, well known saponification reaction. For example, an aqueous solution of the terpolymer can be reacted with sodium hydroxide at reflux overnight. Once the reaction is complete, the pH is adjusted to 7 to 7.5, followed by the precipitation of the polymer in solvent, for example ethanol, washing and then drying the polymer. When the terpolymer is subjected to the saponification reaction, the first portion of the terpolymer is converted to an alcohol and the third portion is converted to an acid. For example, when the terpolymer is vinyl acetate, acrylic acid and maleic anhydride and it is subjected to the saponification reaction, the saponified product is a terpolymer of vinyl alcohol, acrylic acid and maleic acid.

The terpolymer can also be saponified and oxidized. The same saponification reaction can be followed as described above, followed by an oxidation reaction, such as the heating of the polymer in a solution of hydrogen peroxide. This leads to a novel terpolymer containing a first portion of a ketene and a third portion of a dicarboxylic acid. For example, when the terpolymer is vinyl acetate, acrylic acid and maleic anhydride and is subjected to the saponification/oxidation reaction, the product is a terpolymer of ketene, acrylic acid and maleic acid.

The above water-soluble terpolymers are useful as detergent and cleaning agent additives and as dispersants or water-treatment chemicals. Detergent and cleaning compositions of the present invention may be in any of the usual physical forms, such as powders, beads, flakes, bars, tablets, noodles, liquids, pastes, and the like. The detergent and cleaning compositions are prepared and utilized in the conventional manner and are usually based on surfactants and, optionally, on either precipitant or sequestrant builders.

Suitable surfactants are, for example, anionic surfactants, such as from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates and from $C_{12}$ to $C_{16}$ sulfated ethoxylated alkanols and nonionic surfactants such as from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide. The surfactants usable in detergents can also have an amphoteric character and can be soaps.

In general, the surfactants constitute from 2 to 50, preferably 5 to 45 weight percent by weight of the detergent or cleaning formulation. Liquid detergents usually contain as components liquid or even solid surfactants which are soluble or at least dispersible in the detergent formulation. Surfactants suitable for this purpose are liquid polyalkylene oxides or polyalkoxylated compounds, products that can also be used in powdered detergents.

Examples of sequestrant builders contained in the detergent and cleaning agents of the present invention can include phosphates, specifically, orthophosphates, pyrophosphates and especially sodium tripolyphosphate. Further examples are zeolites, sodium carbonate, polycarboxylic acids, nitrilotriacetic acid, citric acid, tartaric acid, salts of the aforesaid acids, and monomeric, oligomeric or polymeric phosphonates.

The amounts of the individual substances used in the preparation of detergent formulations by weight based on the total weight of the detergent formulation are, for example, up to 85 percent sodium carbonate, up to 45 percent phosphates, up to 40 percent zeolites, up to 30 percent nitrilotriacetic acid and phosphonates and up to 30 percent polycarboxylic acids. Because of the severe environmental pollution caused by the use of phosphates, the phosphate content of most detergents and cleaning agents is currently being reduced to less than 30 percent, and preferably the phosphate is being completely eliminated. In certain liquid detergent markets, the use of builders is usually limited to citric acid and its salts or a combination of citrate and fatty acid soap, while in other markets, liquid detergent compositions incorporate an intermediate level of soap, about 15 percent, or tripolyphosphate, about 20 percent, to assist overall cleaning efficacy.

Other common additives to detergent and cleaning agent formulations are bleaching agents, used in an amount of up to 30 weight percent, corrosion inhibitors, such as silicates, used in an amount of up to 25 weight percent and graying inhibitors used in an amount of up to 5 percent. Suitable bleaching agents are for example, perborates, percarbonates or chlorine-generating substances, such as chloroisocyanurates, suitable silicates used as corrosion inhibitors are, for example, sodium silicate, sodium disilicate and sodium metasilicate and examples of graying inhibitors are carboxymethylcellulose, methylcellulose, hydroxypropylmethylcellulose and graft copolymers of vinyl acetate and polyalkylene oxides having a molecular weight of 1000 to 15,000. Other common detergent additives optionally used are optical brighteners, enzymes and perfumes. Powdered detergent formulations can also contain up to 50 weight percent of a diluent, such as sodium sulfate, sodium chloride or sodium borate. The detergent formulations can be anhydrous or they can contain small amounts, for example up to 10 weight percent, of water. Liquid detergents can contain up to 80 weight percent of water.

The above-described biodegradable terpolymers can be added to all detergent and cleaning agent formulations to serve as a detergent builder or anti-incrustation agent. When used as a builder, the terpolymer concentration is from about 1 to 50 percent by weight of the total composition, and when used as an anti-incrustation agent the terpolymer concentration is from about 1 to 10 percent by weight of the total composition.

Of particular importance is the use of the additives according to the invention in phosphate-free and low-phosphate detergents and cleaning agents, particularly those containing a precipitant builder such as sodium carbonate. The low-phosphate formulations contain up to about 25 weight percent of sodium tripolyphosphate or pyrophosphate. In view of their biodegradability, the terpolymers according to the invention are preferably used at high concentration in phosphate-free formulations and serve as builders in place of the phosphates.

If desired, the biodegradable terpolymers according to the invention can be used in detergent formulations together with non-biodegradabe copolymers of acrylic acid and maleic acid or with acrylic acid homopolymers. The last-mentioned non-biodegradable polymers are currently being used as soil redeposition inhibitors in detergent formulations. In addition to the aforementioned polymers, the copolymers of from $C_3$ to $C_6$ monocarboxylic and dicarboxylic acid or maleic anhydride and from $C_1$ to $C_4$ alkyl vinyl ethers are also suitable as soil redeposition inhibitors. The molecular weight of the homopolymers and copolymers is 1000 to 100,000. If desired, these soil redeposition inhibitors can be used in detergents, together with the biodegradable terpolymers of the invention, in an amount of up to 20 weight percent based on the total formulation. Although the known soil redeposition inhibitors based on the said polymers are not biodegradable, in water treatment plants they can be removed from waste water together with the activated sludge on which they are adsorbed. The biodegradable terpolymers can be added to detergent formulations in the free acid form or in completely or partly neutralized form.

Other applications for the terpolymers of this invention include water treatment. Water treatment applications for these terpolymers include dispersing applications, such as in aqueous clay dispersions for paper making, and anti-nucleating agents where minor amounts of the terpolymers can serve as threshold inhibitors for crystal formation or scaling in cooling towers or boilers. When used to inhibit crystal formation or scaling, the water-soluble terpolymers are often combined with corrosion inhibitors such as inorganic or organic phosphates or phosphonates or metallic salts such as zinc compounds and the like. The terpolymers of the present invention can be added directly to the aqueous system or they can be added as a concentrated aqueous composition wherein the copolymer is present in the concentrate at a level of from 20 percent to 60 percent by weight.

The following specific examples are intended to illustrate specific embodiments of the invention which should not be interpreted as narrowing the broader aspects thereof which should be manifest from the specification.

EXAMPLE 1

Terpolymer of 40% Vinyl Acetate/20% Acrylic Acid/40% Maleic Anhydride (mol %)

A 4-neck, one liter round bottom flask, equipped with overhead stirrer, Claisen head, septa inlet, and Them-o-Watch ® thermometer was charged with 225.0 grams of methyl ethyl ketone (MEK) and flushed with nitrogen. The solution was heated to 80° C. and 0.45 grams t-butyl peroxypivalate (75% in mineral spirits) was added. The following solutions were then added:

1. A premixed homogenous solution of 73.50 grams (0.853 mol) of vinyl acetate, 82.41 grams (0.840 mol) of maleic anhydride and 30.50 grams (0.423 mol) acrylic acid. The solution was added, via a pump, over 2 hours, followed by a 4.5 gram wash with MEK. (An alternative to the addition of all the monomers as a premixed feed was to initially add 10 wt. % pre-charge of maleic anhydride and vinyl acetate, and 5 wt % pre-charge of acrylic acid to the reaction solvent.)

2. A solution of 7.0 grams t-butyl peroxypivalate (75% in mineral spirits) diluted to 9.0 grams with MEK was added via a syringe pump over 2 hours.

3. A solution of 4.1 grams methyl 3-mercaptopropionate diluted to 9 grams with MEK was added via a syringe pump over 2 hours.

After completion of the feeds, the reaction solution temperature was maintained for an additional hour at 80° C.

Once the reaction was complete, the solids content was 45.3%, the residual acrylic acid and maleic acid contents were 0.67%, 0.70%, respectively, based on monomer. The solvent was removed and the solid polymer was isolated and dried.

EXAMPLE 2

Partial Hydrolysis

A 100 ml flask equipped with a stirring bar and pH probe was charged with 40 grams water and 8.0 grams of the dried polymer of Example 1. With rapid stirring, 6.46 grams of a 50% NaOH solution was added slowly to prevent exotherm. After 20 minutes, the solution reached a pH of approximately 7.4, and was then freeze dried. The polymer was isolated, ground and oven dried.

As determined by gel permeation chromatography, the weight average molecular weight (Mw) of the polymer was 4790, the number average molecular weight was 3240, and Mw/Mn was 1.48.

EXAMPLE 3

Saponification

A 100 ml round bottom flask equipped with a reflux condenser and stirring bar was charged with 40 grams water, 8.0 grams of the dried polymer of Example 1 and 9 grams of a 50% NaOH solution. The solution was heated at reflux overnight. Then, the pH was adjusted to about 7 to 7.5 with glacial acetic acid. This polymer solution was then slowly dripped into approximately 400 ml. of ethanol. The ethanol was then decanted and the solid washed several times with additional ethanol. The polymer was isolated by suction filtration and oven dried.

EXAMPLE 4

Saponification/Oxidation

A 100 ml round bottom flask was charged with 40 grams water, 9.5 grams of a 50% NaOH solution and 8.0 grams of dried polymer from Example 1. The solution was refluxed overnight. The pH was then adjusted to 7.3 with acetic acid. Then 9.0 grams of 30% $H_2O_2$ was added. The solution was then heated at reflux until a negative starch/KI test for peroxides was obtained (approx. 2.5 hrs.). The pH was readjusted from approx. 8.5 to 7.5 with HOAc. The polymer was isolated by precipitation from a large volume of ethanol. This was followed by several washings with ethanol, filtration, and oven drying.

Based on GPC, the saponified/oxidized terpolymer had a weight average molecular weight of between 2,000 to 3,000 and a Mw/Mn of between 1.25 to 1.40.

EXAMPLES 5-32

Additional Vinyl Acetate/Acrylic Acid/Maleic Anhydride Terpolymers

Additional polymers were prepared according to the above procedures except the ratio of monomers was varied. The polymer composition, Mw, Mw/Mn, and the post-polymerization reaction are listed in Table 2.

EXAMPLE 33

Ethyl Vinyl Ether/Acrylic Acid/Maleic Anhydride Terpolymer

A 4-neck 500 ml. round bottom flask, equipped with overhead stirrer, Claisen head, septa inlet, dry ice condenser, and Them-o-Watch® thermometer was charged with 100.0 grams of methyl ethyl ketone. This solution was heated to 80° C., followed by the addition of 0.20 grams t-butyl peroxypivalate (75%, in mineral spirits). Then the following solutions were added:

1. A premixed homogenous solution of maleic anhydride, 32.26 grams (0.329 mol), 26.20 grams ethyl vinyl ether (0.363 mol) and 30.00 grams methyl ethyl ketone. This solution was added via a pump over 2 hours, followed by a 4.0 grams MEK wash.

2. A solution of 3.62 grams t-butyl peroxypivalate (75% in mineral spirits) diluted to 4.60 grams with MEK was added via a syringe pump over two hours.

3. A solution of 2.25 grams methyl 3-mercaptopropionate diluted to 4.7 grams with MEK was added via a syringe pump over two hours.

4. 26.25 grams of acrylic acid (neat) were added via a syringe pump over two hours.

After completion of the feeds, the solution was held for an additional hour at 80° C. The solvent was removed and the solid polymer was isolated and hydrolyzed as described previously. Based on GPC, this terpolymer had a weight average molecular weight of 4500, a number average molecular weight of 3420 and an Mw/Mn of 1.32.

EXAMPLE 34

The same procedure described in example 33 was followed, except methoxyethyl vinyl ether was substituted for the ethyl vinyl ether. Based on GPC, this terpolymer had a weight average molecular weight of 6700, a number average molecular weight of 3450 and an Mw/Mn of 1.89.

EXAMPLE 35

The same procedure described in example 33 was followed except vinyl carbonate was substituted for the ethyl vinyl ether.

BIODEGRADATION TESTING

Polymer biodegradabilities were measured on a scale of 0 to 100% based on BOD (biological oxygen demand) testing. The results are tabulated in Table 2. The BOD procedure is the method in *Standard Methods for Examination of Water & Wastewater*, page 525, 16th edition (1985).

The BOD test was a closed bottle test whereby a solution of the candidate polymer and mineral salts is inoculated with municipal sewage bacteria. Biodegradation was indicated by oxygen uptake, determined by measuring the dissolved oxygen content of the solution.

BOD test results provided are for 5 mg/300 ml concentrations and are for 25 days.

DETERGENT FORMULATION AND PERFORMANCE EVALUATION

A 4"×4" white cotton swatch was soiled with approximately 1 gram of a 50% slurry (in water) of Skippack clay. The soil, covering a 2" diameter circle centered on the swatch, is allowed to air dry overnight.

Clean fabric (for redeposition test) was a 4"×4" white cotton swatch which was unsoiled.

The detergent compositions were tested in a Terg-o-Tometer at the following conditions; 40° C., 100 rpm, 100 ppm hardness (50% city tap water/50% de-ionized water), 12 minute wash with one 3 minute rinse, 1300 ppm detergent and 5 cloths per pot (3 of them soiled). The wash water was pre-heated, the fabric swatches were added and then dissolved detergent (2.6 grams of a 50% slurry in 100 ml. water) was added. Following the wash period, the swatches were wrung, and following the rinse cycle, the swatches were wrung again and then air dried. Swatches washed in a detergent containing polyacrylic acid homopolymer were always run as a control.

Reflectance was measured using a Pacific Scientific Colorimeter (Colorgard System 1000) and the data recorded using the L,a,b color scale. Detergency values (E) and whiteness index (W.I.) are calculated as:

$$E = \sqrt{(Ls-L)^2 + (as-a)^2 + (bs-b)^2}$$

$$W.I. = L/100(L - (5.715 \times b))$$

where Ls, as, and bs are the reflectivity reading for the soiled swatches and L,a,b are the reflectivity readings for the washed swatches.

Each polymer was evaluated in three separate washing experiments. The detergent composition shown in Table 1 was used for the above described performance evaluation and the results of the detergent performance evaluation are listed in Table 3.

The efficacy of the polymers as calcium carbonate ($CaCO_3$) anti-precipitant, phosphate anti-precipitant, and as a dispersant was also evaluated. These results appear in Table 4.

TABLE 1

| Detergent Component | Amount, % |
|---|---|
| sodium carbonate | 22.0 |
| zeolite A | 16.0 |
| sodium silicate | 2.7 |
| Linear alkyl sulfonates, LAS | 8.3 |
| lauryl sulfate | 8.3 |
| sodium sulfate | 34.0 |
| polymer | 1.7 |
| water | 7.0 |

TABLE 2

| SAMPLE | COMPOSITION[1], (mole %) | | | Mw | Mw/Mn | Ca[2] | BOD$_{25}$ | DESCRIPTION[3] |
|---|---|---|---|---|---|---|---|---|
| | VAc | MalAn | AA | | | | | |
| 1(Comparative) | | | 100 | 4500 | 1.50 | 325.0 | 1.5 | Neutralized |
| 2(Comparat) | 50 | 50 | | 7460 | 1.75 | 265.4 | 8 | Saponified |
| 3 | 50 | 33 | 17 | 10600 | 2.01 | 213 | | Saponified |
| 4 | 50.5 | 33 | 16.5 | 6990 | 1.49 | 308.3 | | Saponified |
| 5(Comparat) | 50 | 50 | | 5210 | 1.48 | 241.4 | | Saponified |
| 6 | 48.7 | 35.5 | 16.8 | 3780 | 1.42 | 274 | | Saponified/Ox. |
| 7 | 48.7 | 35.5 | 16.8 | 4600 | 1.43 | 266.7 | 15.4 | Saponified |
| 8 | 48.7 | 35.5 | 16.8 | 5370 | 1.59 | 256.5 | 15.1 | Partial Hydr. |
| 9 | 47.9 | 47.6 | 15.5 | 7470 | 2.21 | 262.5 | | Partial Hydr. |
| 10 | 47.9 | 47.6 | 15.5 | 3740 | 1.67 | 236.7 | | Saponified |
| 11 | 43.3 | 27.1 | 29.6 | 3970 | 1.64 | 273.5 | 13.9 | Saponified |
| 12 | 43.3 | 27.1 | 29.6 | 5640 | 1.75 | 300.2 | | Partial Hydr. |
| 13 | 43.9 | 26.8 | 29.3 | 5460 | 1.75 | 299.6 | | Partial Hydr. |
| 14 | 43.9 | 26.8 | 29.3 | 4140 | 1.79 | 275 | | Saponified |
| 15 | 44.3 | 26.7 | 30.0 | 3360 | 1.48 | 236 | | Saponified/Ox. |
| 16 | 44.3 | 26.7 | 30.0 | 7010 | 1.74 | 284 | | Partial Hydr. |
| 17 | 33 | 33 | 33 | 3970 | 1.46 | 278.7 | 28.9 | Partial Hydr. |
| 18 | 33 | 33 | 33 | 3570 | 1.49 | 310.0 | | Saponified |
| 19 | 33 | 33 | 33 | 2150 | 1.45 | 265.5 | | Saponified/Ox. |
| 20 | 33 | 33 | 33 | 4290 | 1.62 | 295.5 | | Saponified |
| 21 | 33 | 33 | 33 | 5630 | 1.70 | 261.5 | 18.5 | Partial Hydr. |
| 22 | 33 | 33 | 33 | 2730 | 1.46 | 275.8 | | Saponified/Ox. |
| 23 | 40 | 40 | 20 | 5310 | 1.63 | 276.9 | | Saponified |
| 24 | 40 | 40 | 20 | 5710 | 1.57 | 281.0 | 22.7 | Partial Hydr. |
| 25 | 40 | 40 | 20 | 2850 | 1.40 | 255.4 | | Saponified/Ox. |
| 26 | 45 | 45 | 10 | 6510 | 1.83 | 299.2 | | Partial Hydr. |
| 27 | 45 | 45 | 10 | 4520 | 1.48 | 264.4 | | Saponified |
| 28 | 45 | 45 | 10 | 2120 | 1.40 | 206.9 | | Saponified/Ox. |
| 29 | 30 | 30 | 40 | 3760 | 1.56 | 295.4 | 22.3 | Partial Hydr. |
| 30 | 30 | 30 | 40 | 3400 | 1.41 | 257.1 | | Saponified |
| 31 | 30 | 30 | 40 | 2290 | 1.34 | 207.9 | | Saponified/Ox. |
| 32 | 45 | 45 | 10 | 5490 | 1.79 | 280.2 | | Partial Hydr. |
| 33 | 25 | 25 | 50 | 4580 | 1.55 | 301.0 | 14.3 | Partial Hydr. |
| 34 | 40 | 40 | 20 | 4790 | 1.48 | 303.5 | 18.5 | Partial Hydr. |
| 35 | 40 | 40 | 20 | 4380 | 1.27 | 269.2 | | Saponified |
| 36 | 15 | 15 | 70 | 4380 | 1.48 | 332.0 | | Partial Hydr. |
| 37 | 45 | 35 | 20 | 4590 | 1.60 | * | 13.6 | Partial Hydr. |
| 38 | 33 | 33 | 33 | 5160 | 1.50 | 294.8 | | Partial Hydr. |
| 39 | 50 | 50 | | 4270 | 1.48 | * | | Partial Hydr. |

[1]VAc = vinyl acetate, MalAn = maleic anhydride, AA = acrylic acid
[2]Calcium sequestration, mg $CaCO_3$/gm.
[3]Partial Hydrolysis: Aqueous ring opening of maleic anhydride, pH adjusted to approx. 7.5, acetates are intact.
Saponified: Aqueous ring opening of maleic anhydride, hydroxide cleavage of acetate to alcohol, pH readjusted to 7.5.
Saponified/Oxidized: Aqueous ring opening of maleic anhydride, hydroxide cleavage of acetate to alcohol, partial oxidation of residual alcohols.

TABLE 3

| | Clay Soil Removal/Redeposition Results | | |
|---|---|---|---|
| Sample | Base Composition | Delta E* | Delta WI* |
| 8 | 35 VAc/16 AA/49 MalAn Mw = 5370 | −0.2 | +0.9 |
| 12 | 43 VAc/30 AA/27 MalAn | −0.8 | −0.8 |

TABLE 3-continued

| Sample | Base Composition | Delta E* | Delta WI* |
|---|---|---|---|
| | Clay Soil Removal/Redeposition Results | | |
| | Mw = 5640 | | |
| 21 | 33 VAc/33 AA/33 MalAn | −0.9 | −0.8 |
| | Mw = 5630 | | |
| 17 | 33 VAc/33 AA/33 MalAn | −0.5 | 0.0 |
| | Mw = 3970 | | |
| 24 | 40 VAc/20 AA/40 MalAn | −0.2 | −0.1 |
| | Mw = 5710 | | |
| 29 | 30 VAc/40 AA/30 MalAn | −0.7 | −2.3 |
| | Mw = 3760 | | |
| 32 | 45 VAc/10 AA/45 MalAn | −0.9 | −2.6 |
| | Mw = 5490 | | |
| 33 | 25 VAc/50 AA/25 MalAn | −0.2 | −0.7 |
| | Mw = 4580 | | |
| 37 | 45 VAc/20 AA/35 MalAn | −0.4 | −1.0 |
| | Mw = 4590 | | |
| 39 | 50 VAc/50 MalAn | −1.4 | −6.1 |
| | Mw = 4270 | | |

*Delta E: Detergency index of soiled cloth relative to polyacrylic acid homopolymer.
Delta WI: Whiteness index relative to polyacrylic acid homopolymer.
Note: All performance values are reported relative to polyacrylic acid homopolymer. Statistically significant differences are 1.0 or greater.

TABLE 4

| Sample | Kaolin Dispersancy[1] 2.5 ppm | Kaolin Dispersancy[1] 15 ppm | CaCO$_3$ Anti ppt.[2] | Pyro Anti-ppt.[3] |
|---|---|---|---|---|
| 1 | 787 | 695 | 6.1 | 17.3 |
| 6 | — | 215 | 13.0 | 24 |
| 12 | — | 843 | 9.5 | 9 |
| 21 | 787 | 817 | 13.0 | 14.0 |
| | 303 | 286 | 13.3 | 17.5 |
| 22 | 257 | 563 | 5.0 | 19.4 |
| 23 | 126 | 619 | 2.9 | 20.7 |
| 24 | 811 | 843 | 2.0 | 12.4 |
| 25 | 588 | 773 | 7.5 | 22.3 |

[1]Kaolin dispersancy: turbidity after 60 minutes, higher values desirable.
[2]Calcium carbonate anti-precipitation: Turbidity after 60 minutes, lower values desirable.
[3]Calcium pyrophosphate anti-precipitation: Turbidity after 30 minutes, lower values desirable.

We claim:

1. A terpolymer comprising as polymerized units from about 15 to 55 mole percent of at least one first monomer selected from the group consisting of vinyl acetate, vinyl ethers and vinyl carbonates, from about 10 to 70 mole percent of at least one second monomer of an ethylenically unsaturated monocarboxylic acid, and from about 15 to 55 mole percent of at least one third monomer of an anhydride of a dicarboxylic acid and wherein said terpolymer is formed in a non-aqueous system such that less than about one mole percent of the monomers are hydrolyzed during said polymerization.

2. The terpolymer of claim 1 wherein said monomers are present, as polymerized units in said terpolymer, in an amount of from about 25 to 50 mole percent of said first monomer, of from about 15 to 30 mole percent of said second monomer and of from about 20 to 50 mole percent of said third monomer.

3. The terpolymer of claim 1 wherein said monomers are present, as polymerized units in said terpolymer, in an amount of from about 35 to 45 mole percent of said first monomer, of from about 18 to 25 mole percent of said second monomer and of from about 35 to 45 mole percent of said third monomer.

4. The terpolymer of claim 1 wherein said first monomer is vinyl acetate, said second monomer is acrylic acid and said third monomer is maleic anhydride.

5. A cleaning composition comprising the terpolymer of claim 1 and an inert diluent wherein said terpolymer is present in an effective amount to serve as a detergent builder or anti-incrustation agent.

6. The cleaning composition of claim 5 wherein the terpolymer is a detergent builder and is present in an amount of from 1 percent to 50 percent by weight of the composition.

7. The cleaning composition of claim 5 wherein the terpolymer is an anti-incrustation agent and is present in an amount of between 1 percent and 10 percent by weight of the composition.

8. The cleaning composition of claim 5 wherein said composition is a liquid and said inert diluent is water.

9. The cleaning composition of claim 5 wherein said composition is a powder and said inert diluent is selected from the group consisting of sodium sulfate, sodium chloride, and sodium borate.

10. A water treatment composition comprising the terpolymer of claim 1 and an inert diluent wherein said terpolymer is present at a concentration of from 20 percent to 60 percent based on the total weight of said composition.

11. The water treatment composition of claim 10 wherein said inert diluent is water.

* * * * *